Sept. 20, 1966 F. A. ROSS 3,273,203
APPARATUS FOR FORMING PLASTIC SHEET MATERIAL
Filed March 12, 1962 7 Sheets-Sheet 1
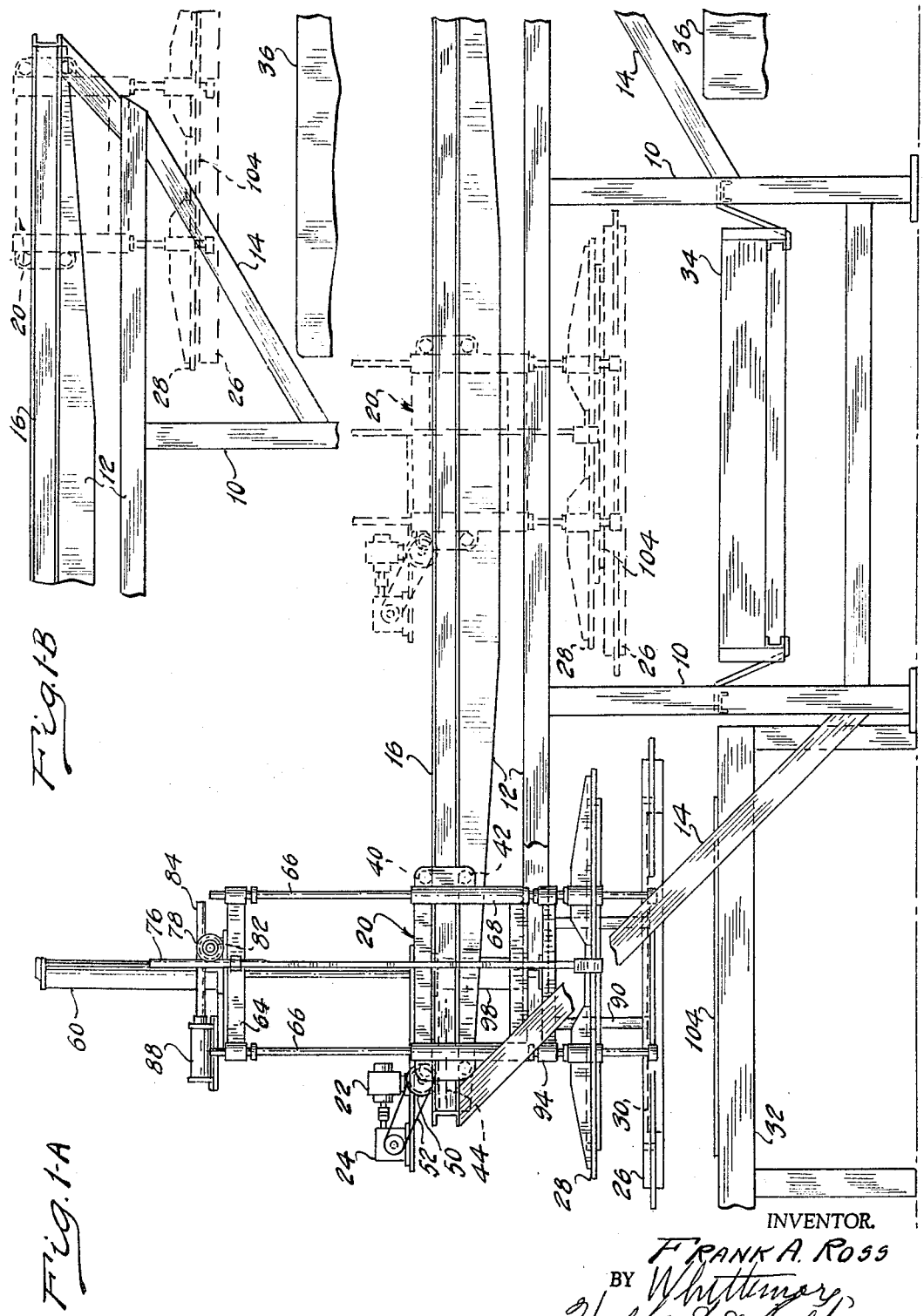
INVENTOR.
FRANK A. ROSS
BY Whittemore,
Hulbert & Belknap
ATTORNEYS.

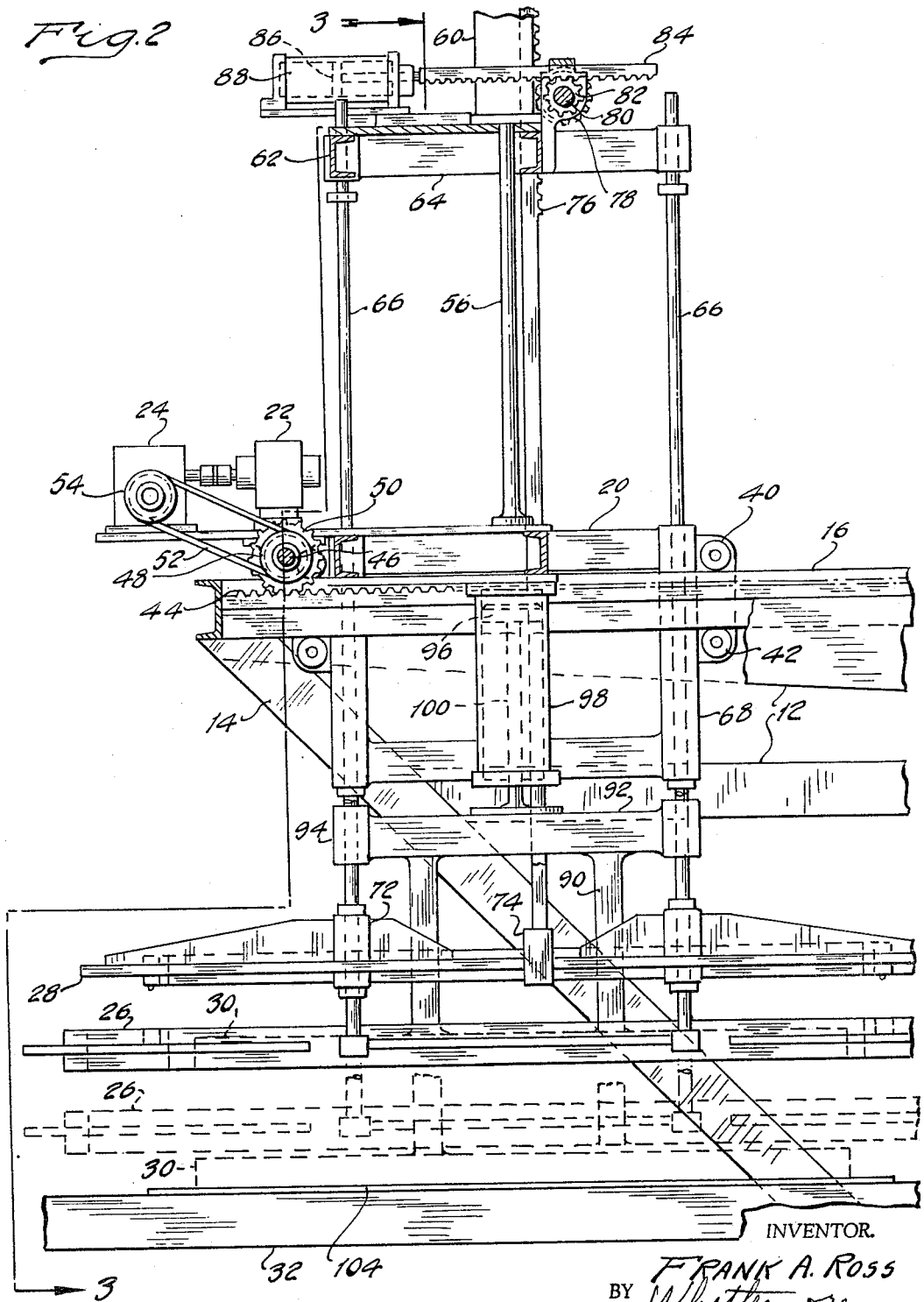

Sept. 20, 1966      F. A. ROSS      3,273,203
APPARATUS FOR FORMING PLASTIC SHEET MATERIAL
Filed March 12, 1962      7 Sheets-Sheet 3
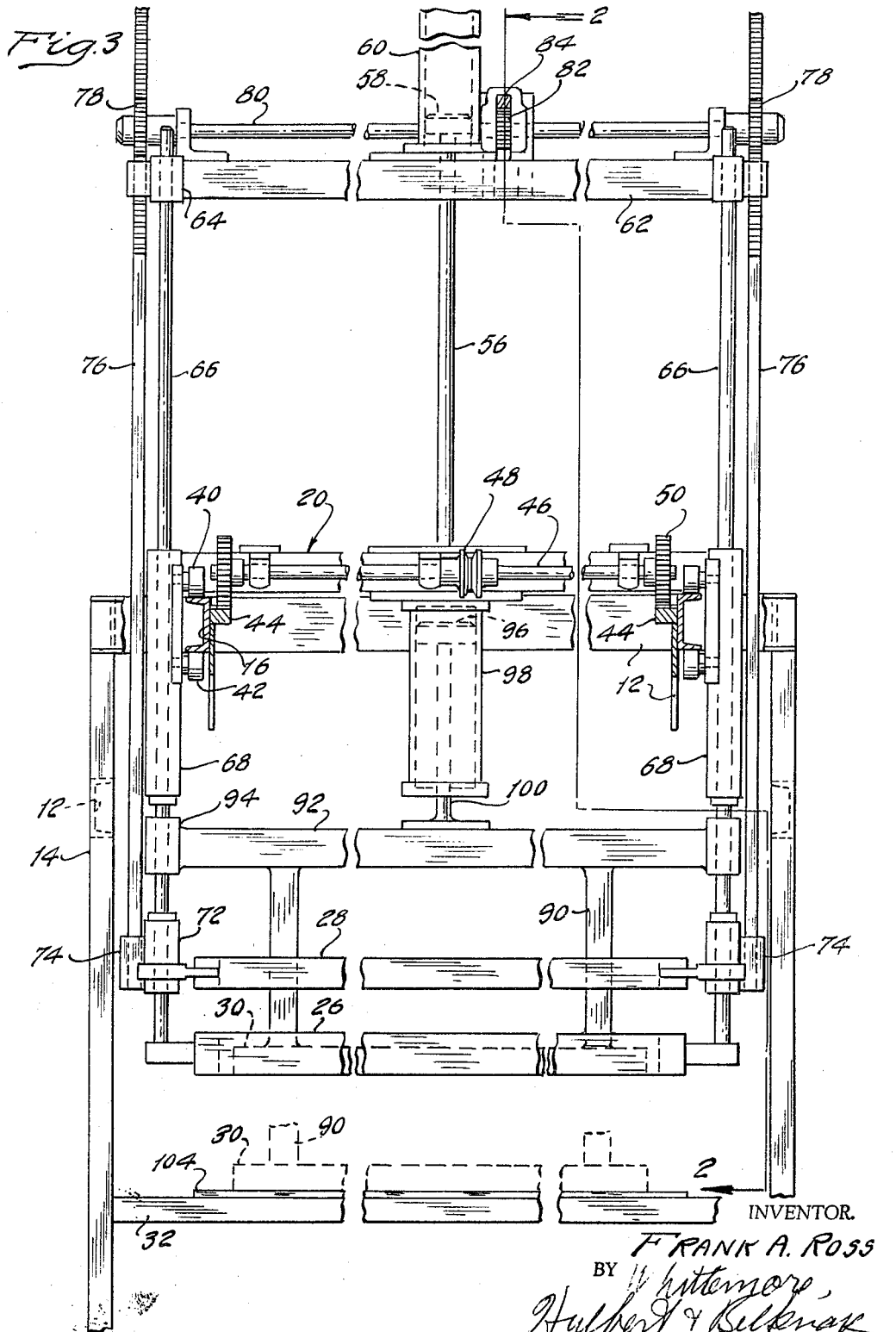
INVENTOR.
FRANK A. ROSS
BY Whittemore,
Hulbert & Belknap
ATTORNEYS

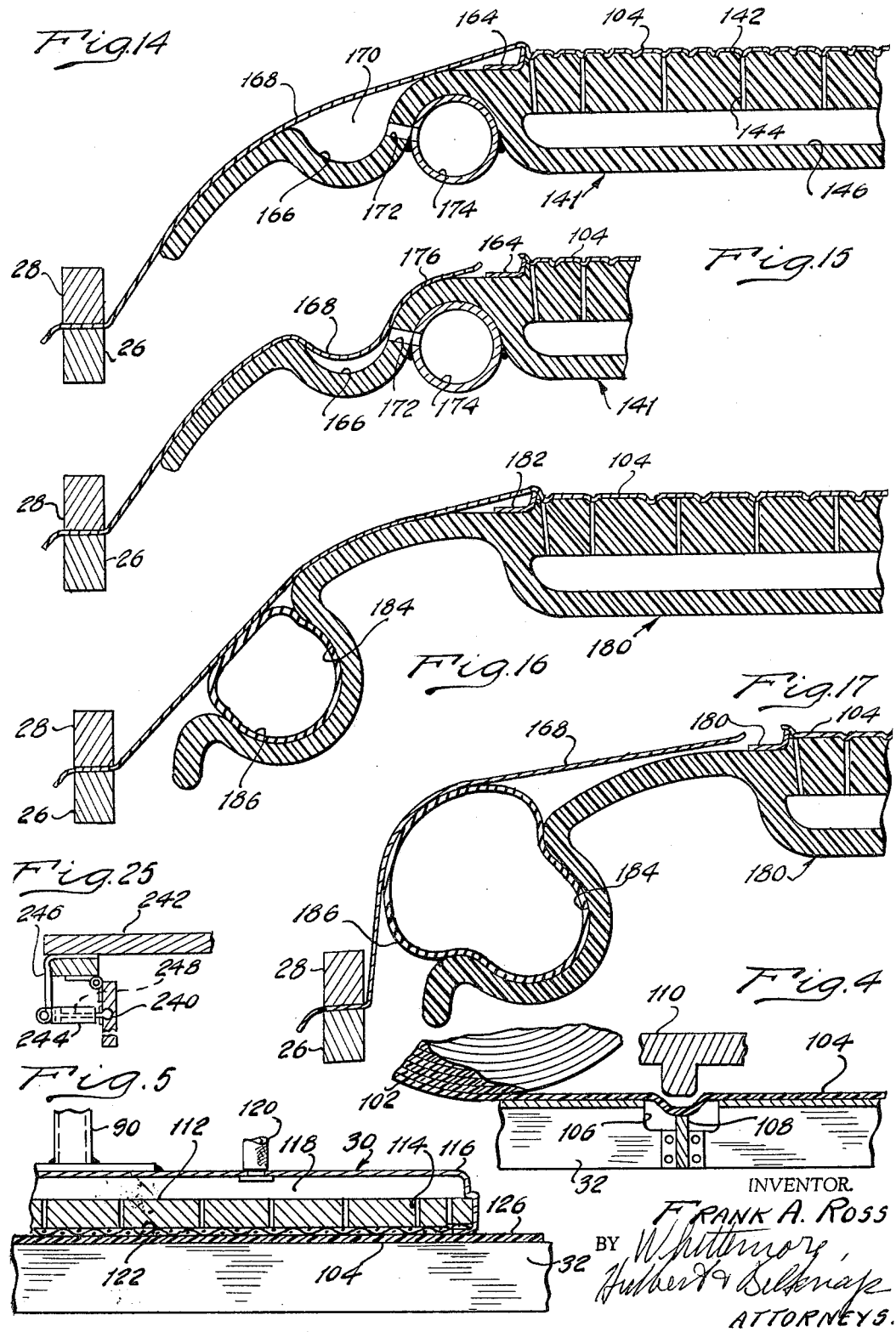

Sept. 20, 1966      F. A. ROSS      3,273,203
APPARATUS FOR FORMING PLASTIC SHEET MATERIAL
Filed March 12, 1962      7 Sheets-Sheet 5
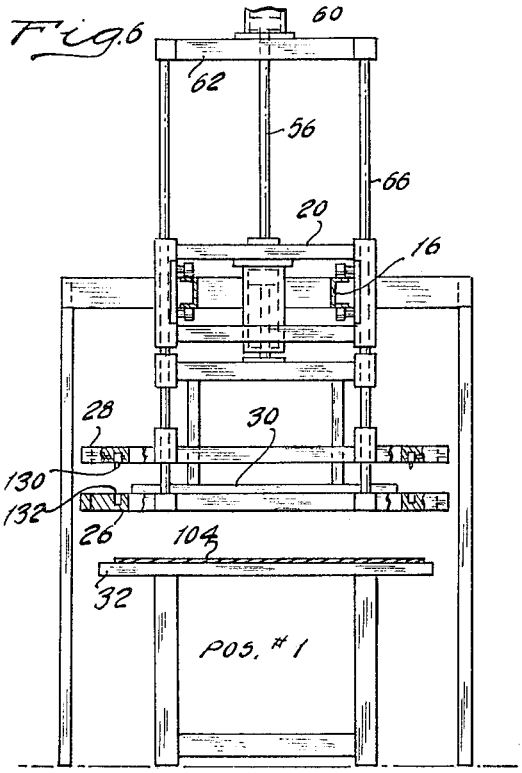
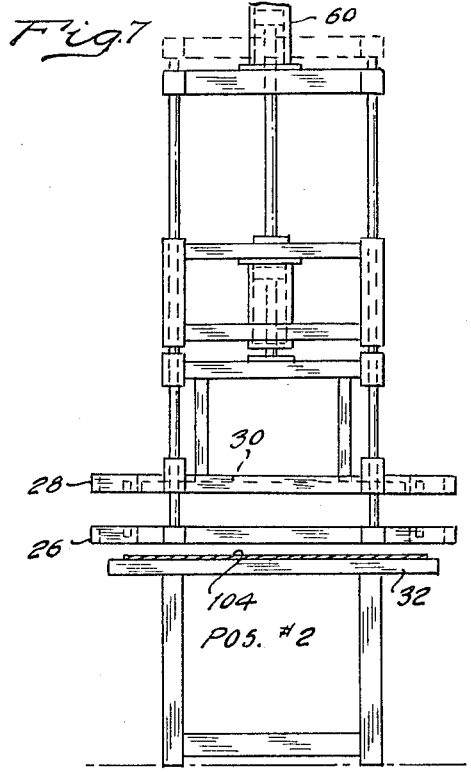
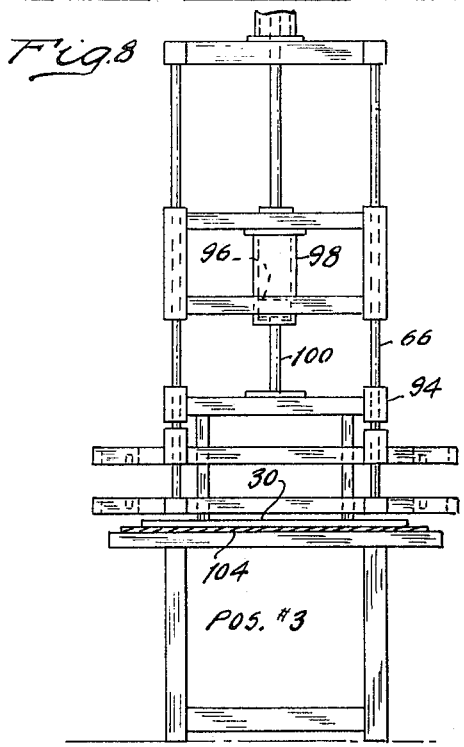
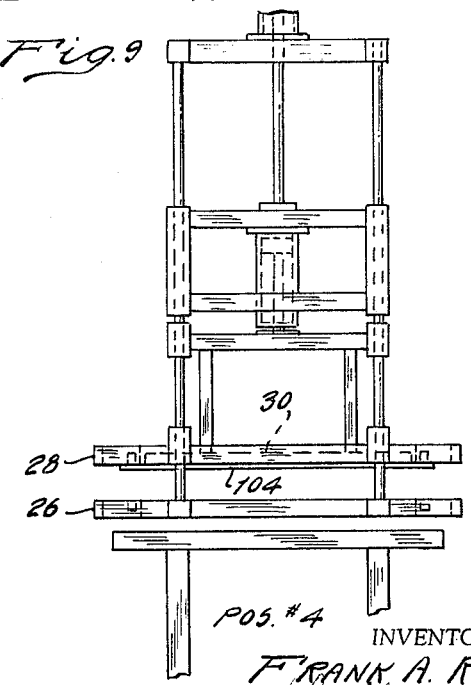
INVENTOR.
FRANK A. ROSS
BY Whittemore,
Hulbert & Belknap
ATTORNEYS Sept. 20, 1966  F. A. ROSS  3,273,203
APPARATUS FOR FORMING PLASTIC SHEET MATERIAL
Filed March 12, 1962  7 Sheets-Sheet 6
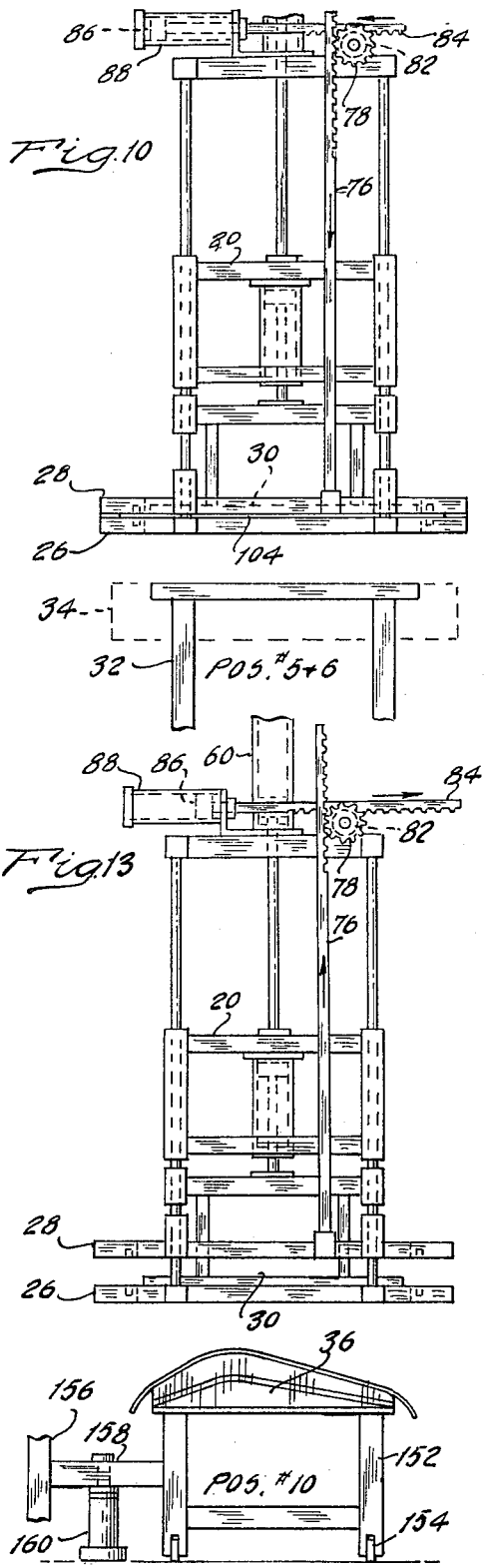
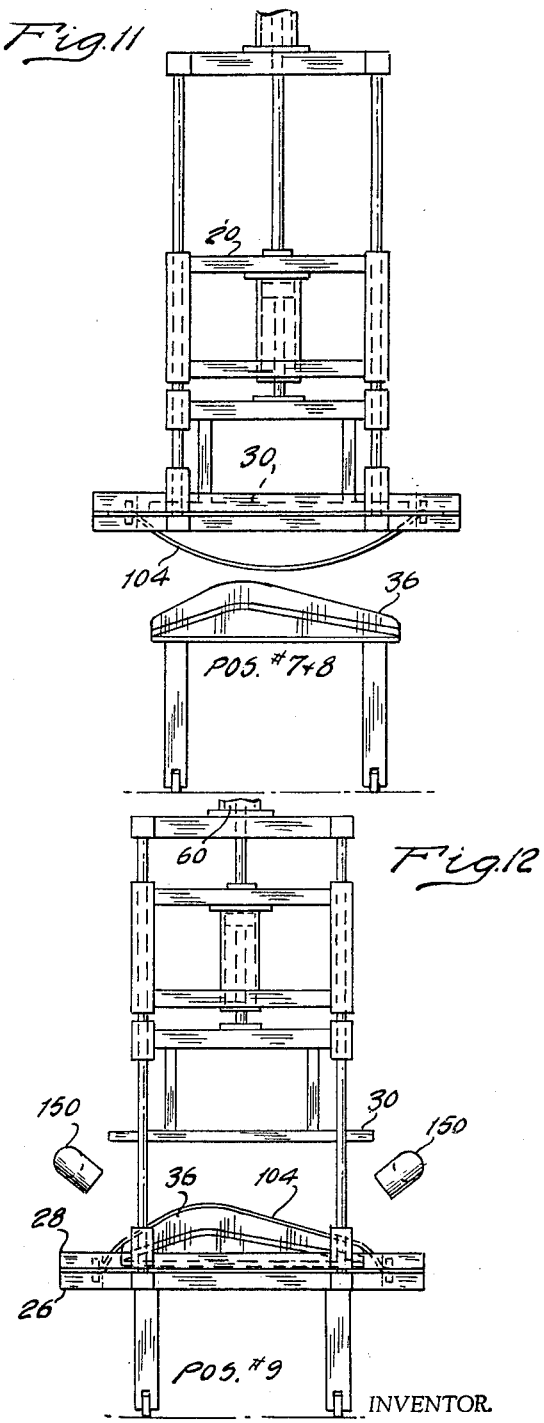
INVENTOR.
FRANK A. ROSS
BY Whittemore,
Hulbert & Belknap
ATTORNEYS.

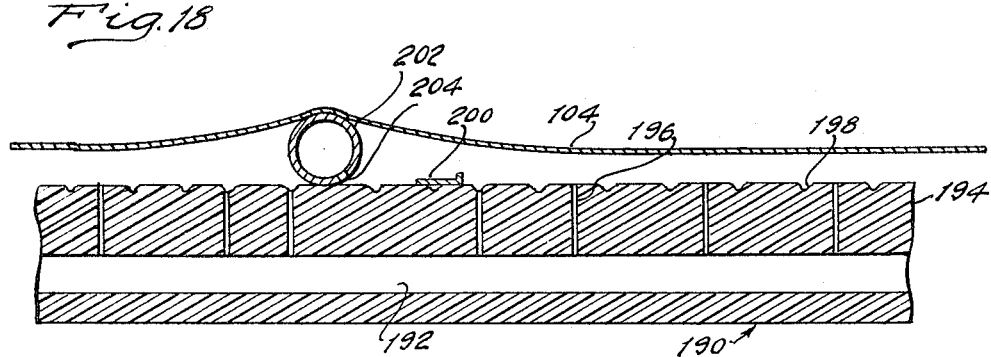
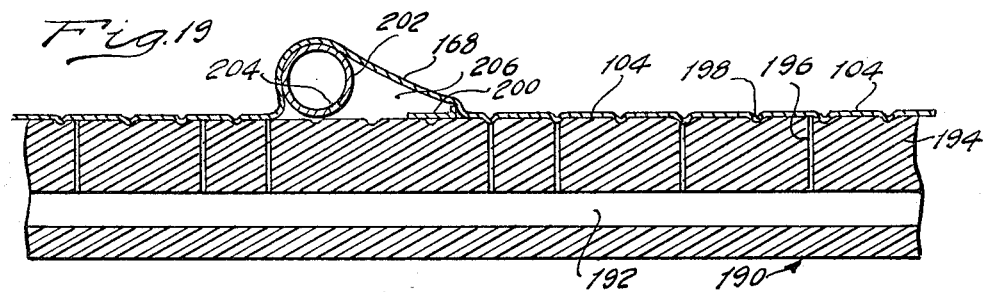
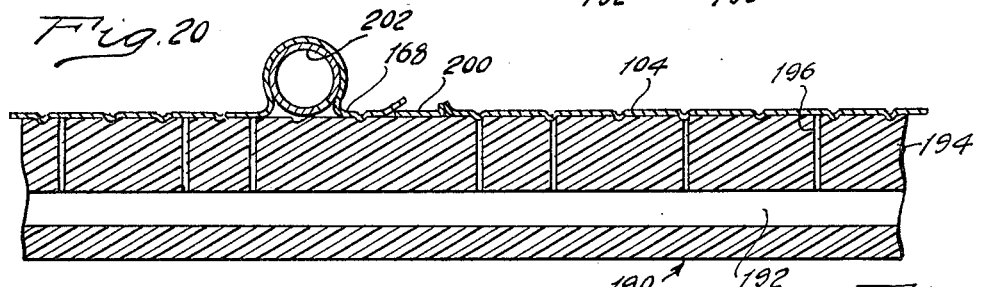
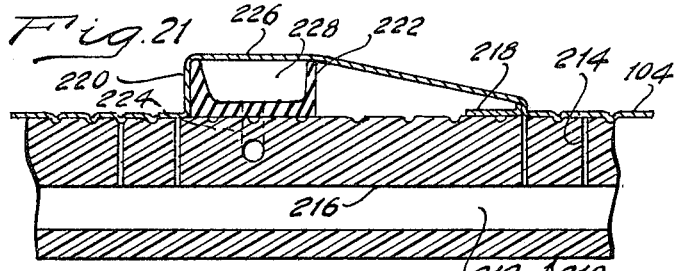
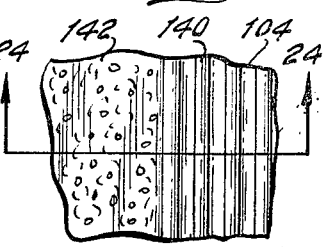
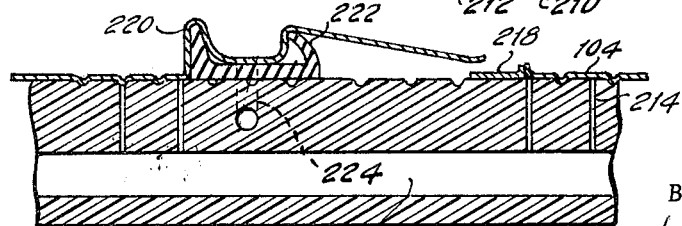

United States Patent Office 3,273,203
Patented Sept. 20, 1966

3,273,203
APPARATUS FOR FORMING PLASTIC
SHEET MATERIAL
Frank A. Ross, Birmingham, Mich., assignor, by mesne assignments, to The B. F. Goodrich Company, New York, N.Y., a corporation of New York
Filed Mar. 12, 1962, Ser. No. 178,978
6 Claims. (Cl. 18—19)

The present invention relates to apparatus for forming plastic sheet material.

It is an object of the present invention to provide apparatus capable of severing a predetermined area of thermoplastic sheet material, transporting the plastic sheet to position adjacent a heater to soften the plastic material, transporting the softened plastic material into position adjacent a mold form, and releasing the heat softened plastic material over the form so as to conform thereto.

It is a further object of the present invention to provide apparatus as described in the preceding paragraph including suction support structure to support substantially the entire area of heat softened plastic material to prevent distortion thereof.

Other objects and features of the invention will become apparent as the description proceeds, especially when taken in conjunction with the accompanying drawings, illustrated preferred embodiments of the invention, wherein:

FIGURES 1A and 1B together constitute a more or less diagrammatic side elevation of the apparatus for forming thermoplastic sheet material.

FIGURE 2 is an enlarged side elevation of a portion of the apparatus, partly in section on the line 2—2, FIGURE 3.

FIGURE 3 is a transverse sectional view on the line 3—3, FIGURE 2.

FIGURE 4 is a fragmentary sectional view showing the method of severing a length of plastic sheet material from a supply roll.

FIGURE 5 is a fragmentary sectional view showing the vacuum support board.

FIGURES 6-13 are a series of views showing the components of the apparatus in positions successively assumed during an operating cycle.

FIGURE 14 is an enlarged sectional view illustrating a preferred automatic trimming device.

FIGURE 15 is a fragmentary view similar to FIGURE 14 showing the edge portion of the sheet material separated from the molded form.

FIGURE 16 is a fragmentary sectional view illustrating a different trimming device.

FIGURE 17 is a view similar to FIGURE 16 showing the parts in the position assumed with the edge portions of the sheet trimmed.

FIGURES 18-20 are fragmentary sectional views showing the application, forming and trimming of the sheet material.

FIGURES 21 and 22 are fragmentary sectional views illustrating yet another modification of the trimming apparatus.

FIGURE 23 is a fragmentary plan view illustrating surface decoration applied to the plastic sheet material.

FIGURE 24 is a section on the line 24—24, FIGURE 23.

FIGURE 25 is a diagrammatic view illustrating a modification of sheet clamping structure.

The apparatus described herein relates primarily to the forming of thermoplastic sheet material. By way of a specific example, it is used in the production of molded floor mats for automotive vehicles. Excellent results have been obtained using a vinyl which is initially supplied in a calendered roll having a thickness of approximately .050 to .055 inch. It is desired to form this material into a molded mat having an overall generally curved contour such as may be required to cause the mat to conform to the shaft tunnel found in most present-day automobiles. In addition, it is desirable to produce a decorative pattern characterized by relatively fine detail, such for example as closely spaced parallel ribs.

In general, this is accomplished by supporting a sheet of vinyl compound, which at room temperature is fairly stiff, by the application of vacuum to its upper surface. The sheet of vinyl is then transported to position overlying a heater, preferably a radiant heater, which brings the temperature of the vinyl to molding temperature. In fact, in order to produce fine detail in the design, the thermoplastic material is heated to a point where it is very soft and highly plastic. However, it is supported throughout substantially its entire surface by the application of vacuum so that although soft, it is not permitted to sag or droop from its carrier.

Thereafter, the heated sheet of thermoplastic material is transported to a position overlying a mold form shaped to the general contour desired to be imparted to the plastic mat, and in addition, having whatever detailed fine design is desired. At this time the vacuum is released more or less gradually from the upper surface of the plastic material which thus, sags downwardly, and is draped progressively over the mold form. The mold is provided with a multiplicity of vacuum passages therethrough leading to a manifold and the application of vacuum causes the plastic sheet to conform to the mold.

The mold is provided around its periphery with a blade preferably adapted to be heated by electrical resistance. After the plastic sheet has cooled and substantially set, vacuum is applied outwardly to peripheral portions of the plastic material in such a way as to draw the material against the electrically heated blade which severs the material and permits it to be drawn away from the trimmed edges of the molded mat.

With the foregoing general description in mind, reference is now made to the drawings.

FIGURES 1A and 1B together disclose the complete apparatus which comprises a frame including posts 10, longitudinally extending beams 12, diagonal bracing struts 14, and longitudinally extending channel members 16 forming a pair of opposed rails.

Movable longitudinally on the rails is a carriage 20 adapted to be driven by means later to be described, but including a motor 22 connected to a speed reducer 24. Connected to the carriage 20 for vertical movement with respect thereto are three separate elements; namely, a frame 26, a clamp 28, and a vacuum support board 30, best seen in FIGURE 2. The carriage is movable longitudinally of the rails 16 from a position overlying a support table 32 to a position overlying a heater 34, and thence to a final position overlying a mold form 36.

Referring now more particularly to FIGURES 2 and 3, the details of the traveling structure will be described. The carriage 20 includes upper rollers 40 and lower rollers 42 engageable respectively with the upper and lower flanges of the channel shaped rails 16. Connected to the webs of the channels or rails 16 are longitudinally extending racks 44, and mounted on the carriage 20 is a transverse drive shaft 46 having intermediate its ends a pulley 48 and having at its outer ends pinions 50 which are in mesh with the racks 44. The pulley 48 is adapted to be connected by a belt 52 to the driving sheave 54 carried by the speed reducer 24. It will be apparent that when the motor 22 is energized resulting rotation of the pinions 50 causes the carriage to move longitudinally of the rails 16.

Extending upwardly from the carriage 20 is a fixed rod 56 which at its upper end carries a piston 58 received within a cylinder 60. The cylinder 60 is fixedly secured to vertically movable structure including cross members 62 and interconnecting members 64. Fixedly secured to the members 62 and 64 are vertically extending rods 66 which extend through guides 68 secured to the carriage 20, and at their lower ends are connected to the lower frame element 26 of two-part clamping structure. The frame element 26 has the configuration of the plastic material to be molded and has an opening therethrough for a purpose which will presently appear. Vertically slidable on the rods 66 which suspend the frame portion of the clamping structure are tubular guides 72 which are connected to the upper or clamp portion 28 of the two-part clamping structure. The clamp 28 is connected at opposite sides through connecting members 74 to a pair of vertically extending racks 76 which engage pinions 78 carried by a cross shaft 80 having a central pinion 82 thereon. The pinion 82 is in mesh with a rack 84 connected to the piston rod of a piston 86 movable within a cylinder 88. It will be apparent that as the rack 84 rotates the pinion 82, rotation is imparted to the pinions 78 thus effecting vertical movement of the racks 76 and hence, vertical movement of the clamp 28 relative to the frame 70. It will further be apparent that this motion of the clamp is specifically relative to the frame. The clamp 28 of course partakes of the vertical motion imparted to the frame by actuation of the cylinder 60 except when the cylinder 88 is operated.

In addition to the relatively vertically movable frame 26 and clamp 28, there is provided the vertically movable vacuum support board 30. The vacuum support board 30 is connected by rods 90 to cross members 92 having at their outer ends guide sleeves 94 slidably movable in guided relation on the rods 66. Vertical movement is imparted to the vacuum support board 30 by a piston 96 vertically movable in a cylinder 98 and connected by a piston rod 100 to the cross member 92.

Referring now to FIGURE 4 there is shown a portion of the support table 32 and on this table or adjacent the same is support means for a continuous roll 102 of the plastic material 104. As previously indicated, this material may be a fairly hard material at room temperature suitable for formation when hot into a floor mat for an automotive vehicle. Vinyl plastics for this purpose are conventional.

In order to sever a predetermined length of the plastic material 104 there is provided a transverse groove 106 extending completely across the table, and located within this groove is a heated blade 108. The upper surface of this blade is not sharp but is intended to sever the portion of the plastic material 104 by in effect, softening or melting the thermoplastic material. For this purpose, vertically movable member 110 is provided. With the mechanical devices in the position illustrated in FIGURE 4 it will be understood that if a length of plastic material has been drawn to the right to be supported on the table 32, the material will span the channel or groove 106 and will be spaced upwardly from the hot blade 108. If, at this time, the member 110 is moved downwardly to press a transverse zone of the plastic sheet against the hot upper surface of the blade 108, the plastic material will soften or melt and will separate along the line of the blade 108. The material still connected to the roll 102 will withdraw slightly to the left and the severed edge of the portion 104 will move away from the blade 108 to the right.

Referring now to FIGURE 5 there is shown the picking up of the severed plastic material 104 by the vacuum support board 30. The vacuum support board includes a pegboard 112 having a multiplicity of through openings 114. The pegboard is supported in a closed casing 116 preferably formed of metal and defining with the pegboard a manifold space 118. The interior of the manifold 118 is connected by suitable means such for example as a hose 120 to a source of vacuum. At the under side of the pegboard 112 vacuum diffusing means 122 are provided and these means may take the form of one or several layers of woven glass fibers. Accordingly, when the vacuum support board 30 is moved downwardly into engagement with the upper surface of the cut-off plastic sheet 104, evacuation of the vacuum support board causes the plastic stock to be firmly supported by the application of vacuum to substantially its entire upper surface. As is well understood, the actual forces retaining the plastic against the under surface of the vacuum support board are the result of differential pressure between the atmospheric pressure at the under side of the plastic stock and the reduced pressure or partial vacuum thereabove.

Referring now to FIGURES 6–13 there is illustrated the relative movement between the parts taking place during a complete cycle. In the position No. 1 illustrated in FIGURE 6, the severed plastic stock 104 is illustrated in position on the table 32. At this time the lower frame 26, upper clamp 28, and vacuum support board 30 are in elevated position above the table. This is the travel position of the three members referred to and is the position which they occupy when the carriage 20 is returned from its final position over the mold form to the initial position over the table 32.

In position No. 2 as indicated in FIGURE 7, fluid pressure has been admitted to the cylinder 60 moving the frame 26 and clamp 28 downwardly as a unit to a position in which the frame 26 is spaced slightly above the sheet 104 on the table 32. At this time the vacuum support board 30 has remained stationary and hence, is now in substantial registration with the clamp 28.

In position No. 3 illustrated in FIGURE 8, fluid pressure has been admitted to the cylinder 98 to move the piston 96 downwardly, the piston rod 100 at this time shifting the vacuum support board 30 downwardly into engagement with the upper surface of the plastic sheet 104. The vacuum support board is guided at this time on the rods 66 by the sleeves 94. Vacuum is admitted to the vacuum support board at this time and will be transmitted from the plenum or manifold chamber 118 through the ports or openings 114 and then diffused substantially uniformly through the porous fabric 122 so that substantially the entire upper surface of the sheet has suction applied uniformly thereto. However, the vacuum support board is dimensioned to occupy slightly less than the entire area of the sheet and edge portions 126 of the sheet extend laterally outwardly therefrom.

It will be understood that at this time the plastic material is at room temperature and hence, it is relatively hard and relatively stiff. However, it has sufficient flexibility to permit it to be drawn upwardly by upward movement of the vacuum support board through the opening in the lower frame 26.

The next succeeding step is illustrated in position No. 4, shown in FIGURE 9, where the frame 26 and clamp 28 remain in the same position shown in FIGURE 8, while the vacuum support board 30 has moved upwardly to the illustrated position. At this time the laterally extending peripheral edge portion of the sheet 104, which was deflected downwardly as the sheet passed through the frame 26, has regained its substantially horizontal position and is directly adjacent the lower surface of the clamp 28.

The next succeeding position which is designated positions Nos. 5 and 6 in FIGURE 10, results from upward movement of the frame 26 into cooperating relation to the clamp 28 so as to clamp the entire peripheral edge portion of the sheet 104 outwardly of the vacuum support board 30.

It will be recalled that ordinarily the clamp 28 moves vertically in unison with the frame 26 as the frame is moved by fluid pressure applied to the cylinder 60. In order to achieve the position illustrated in FIGURE 10 however, it is necessary for the clamp 28 to remain stationary while the frame 26 moves vertically. This of course is accomplished by simultaneously admitting pressure to the cylinder 60 which moves the frame 26 vertically upwardly, while at the same time admitting fluid pressure to the cylinder 88, which through the rack 84, pinions 82 and 78, and rack 76 causes vertical movement of the clamp 28 relative to the frame 26. By properly timing the relative movement between the clamp and frame, the clamp remains stationary in space while the frame moves upwardly into cooperating engagement with the clamp.

In this figure the table is shown at 32 and the heater 34 is indicated in dotted lines. This position is designated as positions Nos. 5 and 6 because the relatively movable vacuum support board, clamp and frame remain in the same position and the carriage is moved from its position over the table to the second position over the heater 34.

The clamping engagement illustrated in this figure may result from area or surface contact between the upper surface of the frame 26 and the lower surface of the clamp 28, but preferably, the clamping engagement is supplemented by pins 130 and the upper surface of the frame 26 is preferably provided with recesses 132 which receive the pins. Thus, the edge of sheet 104 is firmly clamped by pressure applied to cooperating frame surfaces and in addition, is positively engaged by a plurality of pins which penetrate the sheet material.

In the position illustrated in FIGURE 10 the carriage 20 remains stationary for a sufficient period for the thermoplastic sheet 104 to become softened to a condition which permits it to be molded to the desired form. The exact time and temperature of course depends upon the particular sheet material. However, it is important to note that the sheet material at this time is brought to a condition of softness such that without substantially complete area support, it would sag down and quite possibly rupture. However, the application of suction or a partial vacuum substantially uniformly throughout substantially the entire upper surface thereof supports the plastic material smoothly and without distortion.

The condition of softness which is required of the plastic material in order to produce the required moldability is such that it would be impossible to support the plastic material on a screen for example, since the screen would produce visible markings in the plastic material.

Referring now to FIGURE 11 the apparatus is shown in positions designated Nos. 7 and 8. Two positions are indicated because the change from FIGURE 10 represents first a travel of the combined carriage, frame, clamp and vacuum support board from the position over the heater to the final position over the mold form 36. After the carriage 20 has been brought to rest with the supported structure over the form 36, vacuum is released from the vacuum support board and at this time the highly softened plastic sheet 104 sags downwardly substantially to the position illustrated in FIGURE 11.

The plastic form in accordance with the specific embodiment of the invention illustrated herein, is upwardly convex but provided with a transverse concave channel and in addition to the gross shape, it preferably is provided with a relatively fine pattern detail such for example as parallel ribbing indicated at 140 or pebbling indicated at 142 as seen in FIGURES 23 and 24.

In order to cause the highly softened hot plastic sheet material to conform exactly to the general shape and patterning of the mold form, the mold is provided with a multiplicity of very small through openings rendering it substantially porous, and vacuum is applied to these openings. A portion of a special mold form 141 is shown in FIGURE 14 and it will be observed that the mold includes an upper portion 142 having openings 144 communicating with a plenum chamber 146 to which vacuum is applied by suitable means. As a result of the multiplicity of small passages 144, the highly softened plastic sheet 104 is drawn down to conform in detail to the patterned upper surface of the mold. It has been found that, employing stock of the approximate thickness disclosed herein, the pattern of the upper surface of the mold may be employed to produce a similar but of course specific different pattern on the upper surface of the sheet material. The difference in the pattern is of course due to the thickness of the plastic sheet material. However, by taking into account, any desired pattern may be produced on the upper surface of the plastic material by appropriately shaping the pattern on the upper surface of the mold so that either surface of the mat can be the tread surface. It is to be understood that the lower surface of the sheet material, in the particular embodiment of the invention now under discussion, is the exposed or tread surface of the plastic mat.

Referring now to FIGURE 12 there is illustrated the No. 9 position in which the plastic sheet 104 has been deposited on the upper surface of the mold form 36. By comparing FIGURES 11 and 12 it will be observed that the vacuum support board 30 has remained stationary while the frame 26 and the clamp 28 have moved downwardly as a unit. This of course is accomplished by the control of fluid pressure applied to the cylinder 60. As a result of downward movement of the clamping structure the softened plastic material is smoothly and progressively deposited on the upwardly convex surface of the mold form 36. This is accomplished without permitting folds or creases therein and in the position illustrated in FIGURE 12, the plastic material is drawn smoothly over the surface of the mold. At this time vacuum is admitted to the passages extending through the mold and the sheet material is caused to conform thereto in the most precise detail.

While the parts remain in the position illustrated in FIGURE 12, the plastic material is permitted to cool so that it resumes at least partially, its relatively hard resilient condition. If desired, cooling of the plastic material after it has been caused to conform precisely to the mold, may be expedited by blowing cooling air over the plastic material. In FIGURE 12 blowers are diagrammatically indicated at 150.

As a further variation, and in order to increase the production, it may be desirable to provide a plurality of mold forms 36. This arrangement is suggested in FIGURE 13 in which one form 36 is shown on a frame 152 including rollers 154, a portion of a second frame being indicated at 156 connected to the frame 152 by a tie member 158 and adapted to be angularly adjusted about a central pivot support diagrammatically indicated at 160. It will of course be appreciated that as many mold forms may be provided for successive use as are required to prevent interfering with production by delays introduced in waiting for sufficient cooling of the formed plastic material.

While the plastic material remains on the mold form 36, as indicated in FIGURE 12, its edges are trimmed by apparatus which will subsequently be described. After the edges of the formed or molded plastic sheet have been trimmed, the parts are moved to the position designated No. 10, shown in FIGURE 13. By comparing FIGURES 13 and 12 it will be observed that this position is arrived at by upward movement of the frame 26 and clamp 28 relative to the carriage 20 by operation of the cylinder 60, and in addition by upward movement of the clamp 28 relative to the frame 26 by actuation of the cylinder 88. It will be recognized that the No. 10 position illustrated in FIGURE 13 is the same as the initial position No. 1 shown in FIGURE 6, except of course that in FIGURE 13 the carriage is illustrated as overlying the form 36, whereas in FIGURE 6 it is illustrated as transported back to a position overlying the table 32.

Reference has been made to the trimming operation which removes the edge portion of the plastic sheet after it has been substantially cooled. One embodiment of the trimming mechanism is illustrated in FIGURES 14 and 15 where a mold 141 is shown as provided with a trimming blade 164. This blade is adapted to be heated and for this purpose may preferably be in the form an electrical resistance element. The edge of the mold form is shaped to provide a channel 166 which may extend completely around the mold form or which may be provided in a plurality of separate compartments. In any case, the channel 166 is adapted to be closed at its outer edge by the edge portion 168 of the plastic material, which defines with the channel 166 a collapsible chamber 170. The chamber 170 communicates through a plurality of passages 172 with a vacuum conduit 174 so that vacuum may be applied selectively to the chamber 170.

The operation of the trimming mechanism shown in FIGURES 14 and 15 takes place after the molded sheet 104 has been cooled sufficiently to greatly increase its strength and rigidity. At this time current is applied to the blade 164 to bring it to a temperature close to the melting point of the plastic material 104. When the blade has reached this temperature vacuum is admitted to the passageway 174 and this vacuum tends to draw the edge portion 168 of the sheet 104 inwardly of the channel to the position illustrated in FIGURE 15. The application of vacuum initially causes the edge portion 168 to be drawn downwardly and outwardly against the blade 164 and severs the edge portion 168 from the intermediate molded portion of the sheet 104. It will be observed that the channel 166 is so arranged that an edge surface 176 thereof is engaged in sealing relation by the edge portion 168 of the sheet 104. Thus, as the edge portion is initially severed from the intermediate portion of the sheet, the severed edge portion remains in sealing relation to the channel 166 so that the complete continuous edge portion of the sheet may be trimmed in a single operation.

A slightly different embodiment is illustrated in FIGURES 16 and 17 where a mold 180 which is otherwise identical with the mold 141, is provided with a resistance heated blade 182 and a channel 184. In this case the channel 184 includes a continuous expansible tubular element 186 which is adapted to be connected to a source of air under pressure. In this case, in order to sever the edge portion 168 of the sheet 104, pressure is admitted to the tube 186 expanding it to the condition shown in FIGURE 17. This has the effect of drawing an edge portion 168 of the sheet material downwardly and outwardly and pressing it against the heated blade. In this connection it will of course be observed that severance of the edge portion has no effect on the admission of pressure to the interior of the tube 186 and hence, the operation may take place continuously around the complete periphery of the sheet 104 without reference to where initial severance takes place.

Referring now to FIGURES 18–20 there is shown another embodiment of trimming mechanism for the plastic sheet. A special mold 190 is provided having a vacuum chamber 192 therein and an upper mold portion 194 provided with a multiplicity of passages 196. The upper surface of the mold 190 is provided with a pattern such for example as indicated by the shallow grooves or recesses 198. In addition, the upper surface of the mold 190 is provided with a resistance heated blade 200. Finally, at the upper surface of the mold and paralleling the blade 20 is a vacuum conduit 202 having a series of ports 204 therein extending at the side thereof adjacent the blade 200. In FIGURE 18 the sheet 104 is shown as deposited over the upper surface of the mold 190 and at this time it is assumed that neither the chamber 192 nor the conduit 202 is connected to vacuum.

In FIGURE 19 there is illustrated the result of applying vacuum to the chamber 192 while vacuum remains cut off from the conduit 202. In this figure it will be observed that the sheet 104 has been drawn downwardly by suction applied through the passage 196 into exact conformity with the upper surface of the mold 190. At this time, while vacuum remains applied to the chamber 192, the plastic material 104 is allowed to cool, at which time it takes a permanent set with the exception of the small area touching the hot blade 200. At this time vacuum is connected to the conduit 202 and the parts assume the relationship illustrated in FIGURE 20. It will be observed that the application of vacuum to the conduit 202 evacuates the chamber 206, one wall of which is formed by the edge portion 168 of the sheet 104. Evacuation of the chamber 206 draws the edge portion 168 downwardly and outwardly relative to the blade 200 which, due to its temperature softens or melts the material of the sheet and severs the edge portion 168.

Another embodiment of edge trimming mechanism is illustrated in FIGURES 21 and 22. In these figures the mold 210 is again provided with a plenum chamber 212 which communicates through a multiplicity of small passages 214 with the upper surface of the upper portion 216 of the mold. The upper surface of the mold is also provided with an electrically heated blade 218, and disposed outwardly from the blade 218 is an upwardly open channel member 220 formed of rubber or the like and having a flexible wall 222. The interior of the channel is connected by a separate vacuum passage 224 so as to selectively apply vacuum thereto. It will be apparent that an edge portion 226 of the sheet 104 overlies the channel 220 and defines therewith a collapsible chamber 228.

After the plastic sheet 104 has conformed to the upper surface of the mold 210 and has cooled sufficiently to take a permanent set, vacuum is applied through the passage 224 to the interior of the channel 220. This will have the effect of collapsing the chamber 228 to the position illustrated in FIGURE 22 with accompanying flexing of the flexible side wall 222. This will result in drawing the edge portion 230 of the sheet outwardly so that it is pressed against the upper surface of the heated blade 212 and severed therealong. It will be observed in this case that the trimmed edge portion of the sheet material remains in sealing engagement with the channel 220 so that initial severance of a portion of the trimmed edge at one side of the sheet material will not result in a loss of vacuum. In other words, the operation may continue until the edge portion is completely trimmed, irrespective of whether flexing of the inner side wall of the channel commences at one side of the sheet material or whether it takes place uniformly around its periphery.

The apparatus illustrated in detail herein is intended for extremely efficient production of molded mats in which substantially no time is lost. Substantially, the only delay, except those occasioned by movement of moving elements, is at the heating station. Inasmuch as the plastic sheet material is relatively thin and since the heat is preferably applied in the form of radiant heat, the heating cycle is completed in a very few seconds. Preferably, the heaters include gold plated reflectors to provide for the most efficient reflection of radiant heat to the plastic material.

When the heat softened plastic material is deposited over the mold, in accordance with a preferred embodiment of the invention, the mold supporting the plastic material may be indexed to a cooling station while another mold is moved into position to receive the next heat softened sheet of plastic material.

It is desirable for the mold form to be relatively warm so as to prevent quick chilling of the heat softened plastic material before it has an opportunity to conform itself to the configuration of the mold. Preferably, upon starting operation of the system, the molds are initially heated to a suitable temperature, such for example as 180 degrees in the case of a properly compounded vinyl plastic. Thereafter, the continued reception of a series of heat softened plastic sheets will maintain the mold at a suitable elevated temperature.

While the apparatus disclosed herein includes all elements necessary for a very efficient operation, including severance of predetermined lengths of plastic material from a continuous roll of stock, it will of course be understood that certain features of the invention are independently useful and need not be combined in the complete combination. For example, while a very efficient operation results from heating the plastic material by radiant heat while it is suspended by the application of a partial vacuum to substantially its entire upper surface, the present invention also encompasses an operation in which the plastic sheet may be heated to the required moldability while supported on a surface such as that of the table 32. While the plastic material is supported on the heated table in heat softened condition, its upper surface may be contacted by the vacuum support board which is adapted to support the heat softened material without distortion. Thereafter, the edge portions of the heat softened material may be engaged by clamp means and the structure transported to a position overlying the mold forms where the heat softened plastic sheet material may be deposited as described in connection with the preferred embodiment of the invention.

In the apparatus specifically described it will be recalled that the plastic material, prior to being heat softened, was drawn by the vacuum support board through an opening in the lower frame 26, the dimensions of the parts being such that the edge portions of the plastic material outwardly of the vacuum support board were flexed downwardly as the vacuum support board moved upwardly through the opening in the frame. This operation is satisfactory but if preferred, the frame 26 may include pivoted clamping jaws 240, as illustrated in FIGURE 25, movable downwardly and outwardly to a clearance position which permits upward movement of the plastic material without deflection of its edge portions, after which the clamping jaws 240 may be swung upwardly to clamp the edges of the plastic material against the under surface of a clamp 242. Suitable means of course are provided for effecting swinging movement of the jaws 240 between clamping and clearance positions and this means is diagrammatically illustrated in FIGURE 25 as comprising a cylinder 244 pivoted to a bracket 246 and including a piston rod 248 pivotally connected to the swinging jaw 240.

The drawings and the foregoing specification constitute a description of the improved apparatus for forming plastic sheet material in such full, clear, concise and exact terms as to enable any person skilled in the art to practice the invention, the scope of which is indicated by the appended claims.

What I claim as my invention is:

1. Apparatus for depositing a softened sheet over a mold form comprising support structure comprising a body having a porous generally horizontal under surface and peripheral clamping means, means for selectively applying suction throughout said porous surface, means for selectively actuating said clamping means, and means for raising and lowering said clamping means and for raising and lowering said body independently of said clamping means.

2. Forming apparatus comprising a horizontal support table, a heater spaced laterally from said table and a mold form spaced laterally from said heater, a carriage movable over said table, heater and form, a horizontal vacuum board mounted for vertical movement on said carriage, edge clamp means on said carriage vertically movable independently of said vacuum board, means for selectively applying and cutting off vacuum to said board to support sheet material at the underside thereof by suction while disposed above said heater and to cut-off the vacuum to release the portion of said sheet material within said edge clamp means while disposed over said form.

3. Forming apparatus comprising a horizontal support table, a heater spaced laterally from said table and a porous mold form spaced laterally from said heater, a carriage movable over said table, heater and form, a horizontal vacuum board mounted for vertical movement on said carriage, edge clamp means on said carriage vertically movable independently of said vacuum board, means for selectively applying and cutting off vacuum to said board to support sheet material at the underside thereof by suction while disposed above said heater and to cut-off the vacuum to release the portion of said sheet material within said edge clamp means while disposed over said form, means for applying suction through said form to cause the sheet material to conform thereto.

4. Forming apparatus comprising a horizontal support table, a heater spaced laterally from said table and a porous mold form spaced laterally from said heater, a carriage movable over said table, heater and form, a horizontal vacuum board mounted for vertical movement on said carriage, edge clamp means on said carriage vertically movable independently of said vacuum board, means for selectively applying and cutting off vacuum to said board to support sheet material at the underside thereof by suction while disposed above said heater and to cut-off the vacuum to release the portion of said sheet material within said edge clamp means while disposed over said form, means for applying suction through said form to cause the sheet material to conform thereto, a peripheral blade surrounding said form, and means for drawing edge portions of the sheet material downwardly and outwardly to trim the sheet material along said blade.

5. Forming apparatus comprising a horizontal support table, a heater spaced laterally from said table and a porous mold form spaced laterally from said heater, a carriage movable over said table, heater and form, a horizontal vacuum board mounted for vertical movement on said carriage vertically movable independently of said vacuum board, edge clamp means on said carriage, means for selectively applying and cutting off vacuum to said board to support sheet material at the underside thereof by suction while disposed above said heater and to cut-off the vacuum to release the portion of said sheet material within said edge clamp means while disposed over said form, means for applying suction through said form to cause the sheet material to conform thereto, a peripheral blade surrounding said form, means for heating said blade, and means for drawing edge portions of the sheet material downwardly and outwardly to trim the sheet material along said blade.

6. Apparatus as defined in claim 5 in which said last mentioned means is vacuum actuated.

References Cited by the Examiner

UNITED STATES PATENTS

| | | |
|---|---|---|
| 2,189,006 | 2/1940 | Hutchinson. |
| 2,332,926 | 10/1943 | May et al. |
| 2,513,052 | 6/1950 | Roberts _____ 264—90 XR |
| 2,589,379 | 3/1952 | Herzog _____ 264—286 XR |
| 2,624,249 | 1/1953 | Baker et al. |
| 2,655,196 | 10/1953 | Magnani _____ 264—286 XR |
| 2,687,174 | 8/1954 | Richens _____ 225—93 |
| 2,691,797 | 10/1954 | Bertleff et al. _____ 264—90 |
| 2,691,798 | 10/1954 | Winchester et al. |
| 2,832,094 | 4/1958 | Groth. |
| 2,889,651 | 6/1959 | Baldanza _____ 264—92 |
| 2,939,179 | 6/1960 | Penman et al. |
| 2,986,777 | 6/1961 | Carter. |
| 3,042,969 | 7/1962 | Shaul _____ 264—163 XR |
| 3,113,345 | 12/1963 | Butzko. |
| 3,207,821 | 9/1965 | Jones-Hinton et al. ____ 264—92 |

ROBERT F. WHITE, *Primary Examiner.*

MORRIS LIEBMAN, *Examiner.*

M. R. DOWLING, *Assistant Examiner.*